Figure 1:
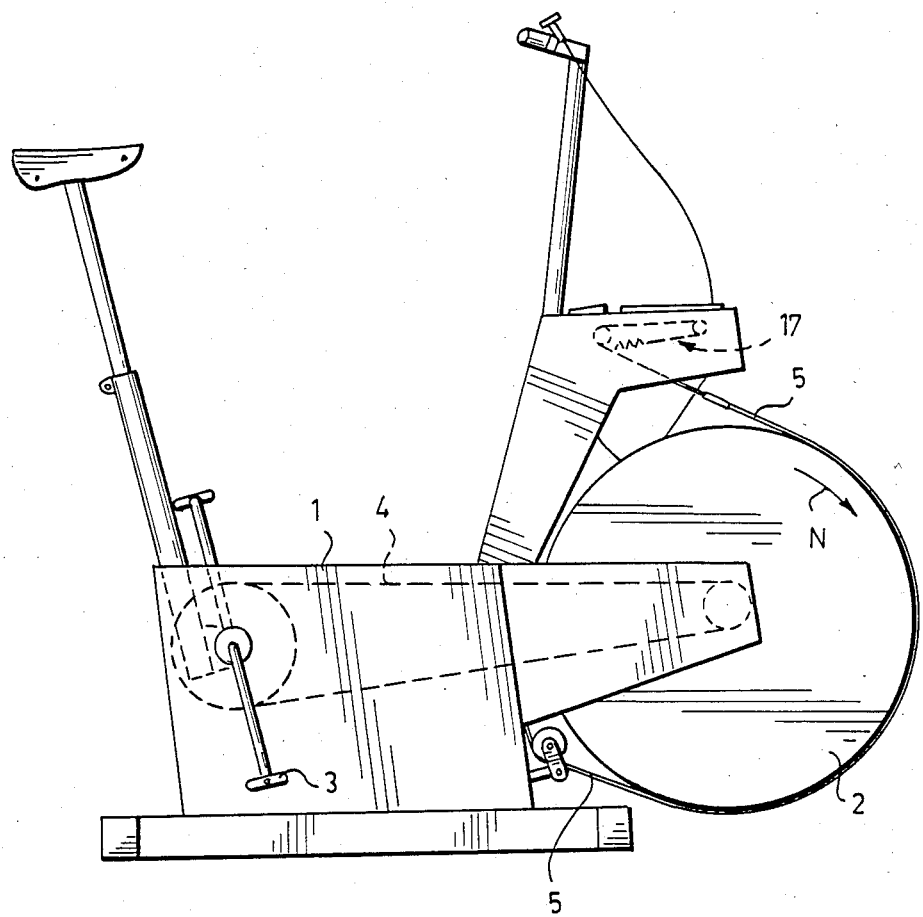

United States Patent [19]

Saarinen

[11] Patent Number: 4,630,818
[45] Date of Patent: Dec. 23, 1986

[54] TORQUE METERING DEVICE FOR A BICYCLE-TYPE ERGOMETER

[75] Inventor: Sulevi Saarinen, Ilmarinen, Finland

[73] Assignee: Tunturipyora Oy, Turku, Finland

[21] Appl. No.: 790,058

[22] Filed: Oct. 22, 1985

[30] Foreign Application Priority Data

Jun. 27, 1985 [FI] Finland ................... 852544

[51] Int. Cl.[4] .............. A63B 21/00; A61B 5/22; G01L 3/18
[52] U.S. Cl. ...................... 272/73; 73/379; 73/862.12; 272/DIG. 5
[58] Field of Search ............ 272/73, DIG. 4, DIG. 5; 116/283, 285, 309; 73/862.12, 379, 380, 381

[56] References Cited

U.S. PATENT DOCUMENTS

| 2,989,870 | 6/1961 | Stahl | 73/432 A |
| 3,662,601 | 5/1972 | Strong | 73/432 A |
| 4,419,890 | 12/1983 | Kotamäki | 272/DIG. 5 |

FOREIGN PATENT DOCUMENTS 1961488 10/1979 Fed. Rep. of Germany ........ 272/73

Primary Examiner—Richard J. Apley
Assistant Examiner—S. R. Crow
Attorney, Agent, or Firm—Scully, Scott, Murphy & Presser

[57] ABSTRACT

The invention relates to a torque metering device for a bicycle-type ergometer, in which ergometer the braking force is steplessly adjustable and in which the rotating movement is compensated by means of a flywheel. The rotating movement of the flywheel can be braked by means of a belt (5) which is pressed against the outer periphery of the flywheel and moves limitedly with the flywheel. The movement of the belt (5) with the flywheel is restricted by means of a spring member (6) connected to one end of the belt and the frame structure of the ergometer. In order to provide a reliable and easily readable metering device, the device is so constructed that it comprises a pin member (7) fastened on the belt (5) and means (8) for rotating an indicator (10) journalled for rotation. The rotating means (8) of the indicator are journalled on the frame structure (1) at the central portion thereof. One end of the rotating means (8) of the indicator is connected to the pin member (7), the other end being correspondingly secured on a shaft (12) of the indicator (10) in such a manner that a linear movement of the pin member (7) moves one end of the rotating means around the journalling point (11) of said means, thus effecting a corresponding rotating movement of the other end of the rotating means (8), which movement turns the indicator (10).

3 Claims, 4 Drawing Figures

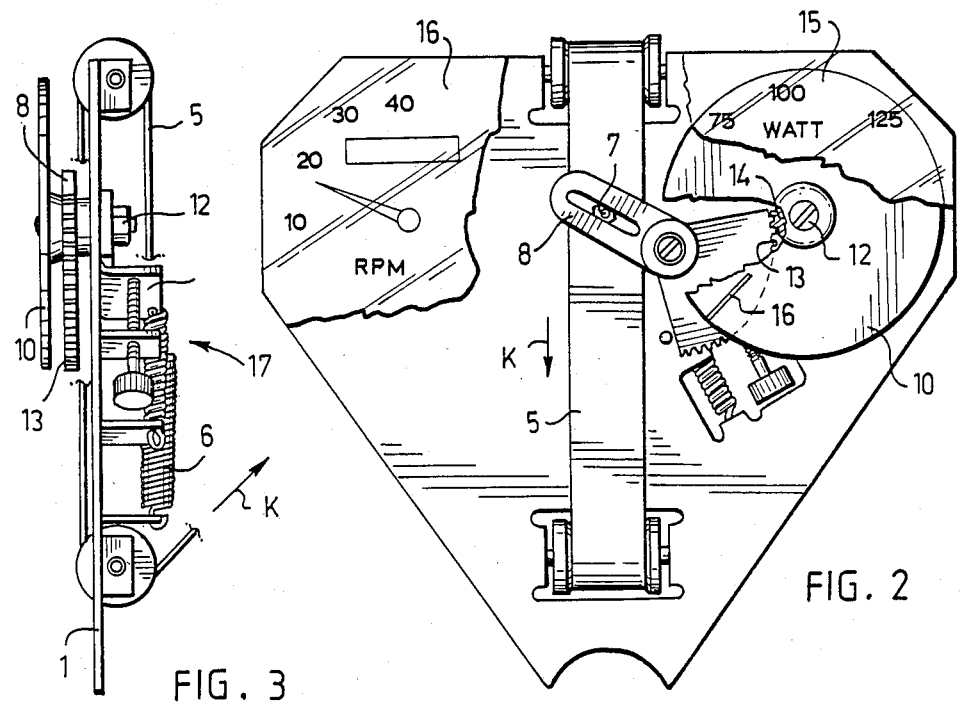
FIG. 3
FIG. 2
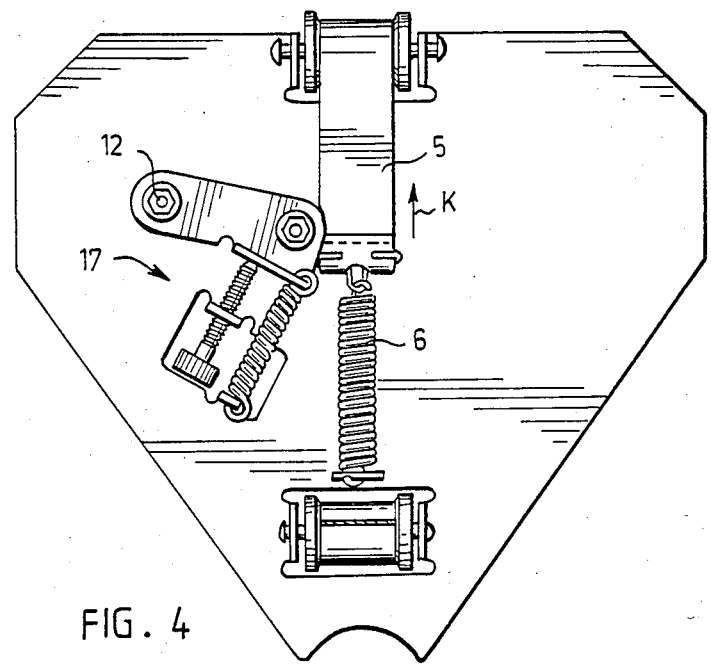
FIG. 4

TORQUE METERING DEVICE FOR A BICYCLE-TYPE ERGOMETER

The invention relates to a torque metering device for a bicycle-type ergometer, in which ergometer the braking force is steplessly adjustable and in which the rotating movement is compensated by means of a flywheel, whereby the rotating movement of said flywheel is braked by means of a belt or the like which is pressed against the outer periphery of the flywheel and moves limitedly with the flywheel, the movement of the belt with the flywheel being restricted by means of a spring member connected to one end of the belt and the frame structure of the ergometer.

Various torque metering devices are today extremely well-known in connection with different kinds of stationary exercise cycles. An example of known solutions would be the device disclosed in Finnish Patent Specification No. 47,843.

The problem mainly lies in that it has been extremely difficult to fit a torque metering device particularly in an exercise cycle having a belt brake. Therefore most exercise cyles of this type, especially those intended for domestic use, have no torque meters at all. The solution of Finnish Patent Specification No. 47,843 is not suitable for a cycle having a belt brake, because the movement of the belt in the direction of the rotating movement of the flywheel is all too small, whereby the scale would correspondingly be small and unclear. A metering device of this kind would be of no use in practice, for the reading of the indicator could not be seen properly when treadling the bicycle.

The object of the invention is to provide a torque metering device for bicycle-type ergometers having a belt brake and intended for domestic use in particular. This is achieved by means of a torque metering device according to the invention, which is characterized in that the device comprises a pin member fastened on said belt and means for rotating an indicator which is journalled for rotation, that said rotating means of the indicator are, essentially at the central portion thereof, journalled on the frame structure, and that one end of the rotating means of the indicator is connected to said pin member, the other end being correspondingly secured on a shaft of the indicator in such a manner that the linear movement of the pin member with the belt moves one end of the rotating means of the indicator around the journalling point of said means, thus effecting a corresponding rotating movement of the other end of the rotating means, which movement turns the indicator.

An advantage of the invention is mainly that a sufficiently wide movement of the indicator makes it possible to provide a scale of a sufficient clarity, whereby the indicator can be advantageously followed when the ergometer is treadled. A further advantage of the invention is its simple construction, whereby the production and maintaining costs remain very low.

The invention will be more closely described in the following by means of one preferred embodiment of the invention, said embodiment being illustrated in the attached drawing, wherein FIG. 1 illustrates the principal features of a bicycle-type ergometer provided with a torque metering device according to the invention, FIG. 2 is a top view of the principal features of the torque metering device according to the invention, FIG. 3 is a side view of the device according to FIG. 2, and FIG. 4 illustrates the device of FIGS. 2 and 3 as viewed from below.

FIG. 1 illustrates the principles of a bicycle-type ergometer, the frame structure of the ergometer being indicated by the reference numeral 1. A heavy flywheel 2 is rotatably mounted in said frame structure 1, whereby the treadling force from pedals 3 is transmitted by means of a chain transmission 4 or the like to the flywheel 2. A belt used for braking of the rotating movement of the flywheel is indicated by the reference numeral 5 in the Figure. The press force exerted on the peripheral surface of the flywheel 2 by the belt 5 can be steplessly adjusted by means of a suitable tightening mechanism (not shown in the Figure). It is obvious that the belt 5 tends to the displaced in the direction of movement of the flywheel the extensively, the more the band is tightened against the flywheel. The direction of rotation of the flywheel 2 is shown by the arrow N in the Figure. The displacement of the belt 5 with the flywheel is counteracted by a spring member 6 connected to one end of the belt 5 and the frame structure 1. Said spring member 6 can be seen in FIG. 3, for instance. The matters discussed above belong to the prior art, so they are not more closely described here.

The torque metering device according to the invention comprises a pin member 7 fastened on the belt 5 and means 8 for rotating an indicator 10 which is journalled for rotation. Said rotating means 8 of the indicator is journalled at the central portion thereof on the frame structure 1. The journalling point is shown in FIG. 2 by the reference numeral 11. One end of said rotating means 8 of the indicator is connected to the pin member 7 by means of a sliding joint, the other end being secured on a shaft of the indicator 10. The shaft of the indicator 10 is shown in the Figures by the reference numeral 12.

When the ergometer is treadled, the belt 5 tends to be displaced in the direction of the arrow K (FIGS. 2-4). It is obvious that the direction K corresponds to the direction of movement N of the flywheel. The pin member is thereby linearly displaced with the belt 5, simultaneously pivoting one end of the rotating means 8 of the indicator around the journalling point 11 of the rotating means. On account of said movement, also the other end of the indicator rotating means is pivoted around the journalling point 11 and simultaneously turns the indicator. It is clear that when the treadling is stopped the belt is displaced by the action of the spring 6 in a direction opposite to the direction K, thus returning to its initial position, whereby the indicator correspondingly returns back to a 0-position.

In the example of the Figures, the connection between the rotating means 8 of the indicator and the shaft 12 of the indicator 10 is effected by means of a curved cogging 13. The center of incurvature of said cogging 13 is positioned in the journalling point 11 of the rotating means. The cogging of cogged wheel 14 provided on the shaft 12 of the indicator naturally fits said cogging 13.

Because the above-mentioned mechanism enables the movement of the indicator to be made considerably more wide that the movement of the belt 5, said indicator can be advantageously fitted so as to directly show the effect applied to the treadling at least at one speed of rotation. This can be carried out by forming a scale 15 so that it directly shows the effect, as in FIG. 2. The used speed of rotation can be read on a conventional revolution counter 16.

The above example is, of course, by no means intended to restrict the invention, but the invention can be modified in various ways within the scope of the claims. So it is self-evident that the device of the parts thereof do not need to be exactly similar to those shown in the Figures, but other kinds of solutions are possible as well. For instance, the belt 5 does not need to extend through idler wheels in the manner shown in the Figures, but a linear course of the belt is fully possible. The connection between the rotating means of the indicator and the shaft of the indicator can also be carried out otherwise than by means of a cog transmission. Frictional transmission may be mentioned as an example. Besides the solution of the Figures, i.e. a rotating indicator dial with an indicating line 16 and a graduation provided on the covering, the scale 15 can be effected in any other way. Accordingly, it is fully possible to use, e.g., a conventional rotating indicator needle and a fixed graduation, or a rotating indicator dial provided with a graduation and an indicator line provided on the covering. In addition, it is possible to provide a graduation which indicates the effect used for treadling at two, three etc. speeds of rotation. The device can, naturally, be provided with any suitable calibration device which ensures proper indication of the device. In the example of the Figures, the calibration device is generally indicated by the reference numeral 17.

I claim:

1. Torque metering device for a bicycle-type ergometer, in which ergometer the braking force is steplessly adjustable and in which the rotating movement is compensated by means of a flywheel (2), whereby the rotating movement of said flywheel is braked by means of a belt (5) or the like which is pressed against the outer periphery of the flywheel and moves limitedly with the flywheel, the movement of the belt with the flywheel being restricted by means of a spring member (6) connected to one end of the belt and the frame structure (1) of the ergometer, characterized in that the device comprises a pin member (7) fastened on said belt (5) and means (8) for rotating an indicator (10) which is journalled for rotation, that said rotating means (8) of the indicator are, essentially at the central portion thereof, journalled on the frame structure (1), and that one end of the rotating means (8) of the indicator is connected to said pin member (7), the other end being correspondingly secured on a shaft (12) of the indicator (10) in such a manner that the linear movement of the pin member (7) with the belt (5) moves one end of the rotating means (8) of the indicator around the journalling point (11) of said means, thus effecting a corresponding rotating movement of the other end of the rotating means (8), which movement turns the indicator (10).

2. Torque metering device according to claim 1, characterized in that one end of said rotating means (8) of the indicator is provided with a curved cogging (13), the center of incurvature of which is positioned in the journalling point (11) of the rotating means (8) of the indicator and that the shaft (12) of the indicator (10) is provided with a cogged wheel (14) which fits said cogging (13).

3. Torque metering device according to claim 1 or 2, characterized in that the movement of the indicator (10) directly shows the effect used for treadling at least at one speed of rotation.

* * * * *